(12) United States Patent
Komuro et al.

(10) Patent No.: US 11,290,044 B2
(45) Date of Patent: Mar. 29, 2022

(54) MOTOR CONTROL DEVICE

(71) Applicant: HITACHI AUTOMOTIVE SYSTEMS, LTD., Hitachinaka (JP)

(72) Inventors: Atsushi Komuro, Hitachinaka (JP); Kohei Myoen, Hitachinaka (JP)

(73) Assignee: HITACHI ASTEMO LTD., Ibaraki (JP)

( * ) Notice: Subject to any disclaimer, the term of this patent is extended or adjusted under 35 U.S.C. 154(b) by 0 days.

(21) Appl. No.: 16/971,516

(22) PCT Filed: Jan. 24, 2019

(86) PCT No.: PCT/JP2019/002179
§ 371 (c)(1),
(2) Date: Aug. 20, 2020

(87) PCT Pub. No.: WO2019/163382
PCT Pub. Date: Aug. 29, 2019

(65) Prior Publication Data
US 2020/0389107 A1 Dec. 10, 2020

(30) Foreign Application Priority Data
Feb. 26, 2018 (JP) .............................. JP2018-032572

(51) Int. Cl.
*H02P 21/00* (2016.01)
*H02P 21/05* (2006.01)
(Continued)

(52) U.S. Cl.
CPC .............. *H02P 21/05* (2013.01); *H02P 21/18* (2016.02); *H02P 21/22* (2016.02); *H02P 27/12* (2013.01)

(58) Field of Classification Search
CPC .......... H02P 21/05; H02P 21/18; H02P 21/22; H02P 27/12
See application file for complete search history.

(56) References Cited

U.S. PATENT DOCUMENTS 6,335,605 B1    1/2002 Negoro
2009/0133947 A1    5/2009 Yoshihara et al.
(Continued)

FOREIGN PATENT DOCUMENTS

JP      35-20002 B2    4/2004
JP      2008-050075 A    3/2008
(Continued)

OTHER PUBLICATIONS

Extended European Search Report dated Jun. 28, 2021 for European Patent Application No. 19758189.5.
(Continued)

*Primary Examiner* — Erick D Glass
(74) *Attorney, Agent, or Firm* — Volpe Koenig

(57) ABSTRACT

Provided is a motor control device capable of suppressing a sudden change in torque due to spike noise.
A control device (motor control device) continues motor control using dq-axis current command values Id* and Iq* (current command values) or dq-axis detection current values real_Id and real_Iq before detecting a noise state (detection current values before a current supplied to a motor suddenly changes) instead of dq-axis detection current values real_Id and real_Iq (latest detection current values) when the current changes suddenly.

7 Claims, 4 Drawing Sheets

(51) Int. Cl.
  *H02P 21/18*   (2016.01)
  *H02P 21/22*   (2016.01)
  *H02P 27/12*   (2006.01)

(56) References Cited

U.S. PATENT DOCUMENTS

| | | |
|---|---|---|
| 2010/0320950 A1 | 12/2010 | Inoue et al. |
| 2013/0278187 A1 | 10/2013 | Suzuki et al. |
| 2014/0091740 A1 | 4/2014 | Suzuki et al. |
| 2014/0184114 A1* | 7/2014 | Omata ............... H02N 2/0075 318/400.02 |
| 2015/0229247 A1* | 8/2015 | Nakai ................. B60L 15/025 318/400.02 |
| 2018/0191288 A1* | 7/2018 | Li ........................ H02P 6/185 |
| 2020/0255067 A1* | 8/2020 | Tanaka ............. B62D 15/0235 |

FOREIGN PATENT DOCUMENTS

| | | |
|---|---|---|
| JP | 2013-225991 A | 10/2013 |
| WO | 2009-113509 A1 | 9/2009 |

OTHER PUBLICATIONS

International Search Report, PCT/JP2019/002179/ dated May 21, 2019, 1 pg.

\* cited by examiner

MOTOR CONTROL DEVICE

TECHNICAL FIELD

The present invention relates to a motor control device.

BACKGROUND ART

Hybrid vehicles and electric vehicles using a motor as a power source have been known, and in a motor control system mounted to such an electric vehicle, motor drive control using an inverter is normally performed.

In the motor drive control, a current command value required to drive the motor is calculated according to a torque command value from a host, and feedback control is performed so that a current actually flowing through the motor matches the current command value.

The torque command value is calculated by a host controller based on the position of an accelerator or a brake (the amount of depression) detected by a position sensor or the like. The current flowing through the motor is detected by a current sensor provided on a power line connecting the inverter and the motor.

As a conventional technology, a vector control device for an induction motor has been known (for example, see PTL 1). PTL 1 discloses that vector control is used to control a motor, and a sum of a motor voltage generation value by feedforward control and a motor voltage generation value by feedback control is controlled as a voltage generation value of a motor.

CITATION LIST

Patent Literature

PTL 1: JP 3520002 B2

SUMMARY OF INVENTION

Technical Problem

PTL 1 does not make any mention of the behavior when any spike noise is applied to a current sensor. In the technique as disclosed in PTL 1, when spike noise is generated, current feedback control is performed using a detected current to which the noise is applied, and there is a problem that a sudden change in motor drive current, and therefore a sudden change in torque are caused.

An object of the present invention is to provide a motor control device capable of suppressing a sudden change in torque due to spike noise.

Solution to Problem

In order to achieve the above object, according to the present invention, there is provided a motor control device that continues motor control using a current command value or a detection current value before a current supplied to a motor changes suddenly instead of a latest detection current value when the current changes suddenly.

Advantageous Effects of Invention

According to the present invention, a sudden change in torque due to spike noise can be suppressed. Problems, configurations, and effects other than those described above will be clarified by the following description of an embodiment.

DESCRIPTION OF EMBODIMENTS

Hereinafter, the configuration and operation of the motor control system will be described with reference to the drawings. The motor control system according to an embodiment of the present invention replaces a detected current when spike noise is applied to a current sensor in order to prevent a sudden change in torque.

Here, the spike noise is a general term for factors that a current value recognized by a microcomputer that executes software for motor control causes a behavior different from the behavior of a physical current value. For example, it is conceivable that a disturbance may be applied to a sensing unit (current sensor), noise may be generated in an AD conversion unit when a sensor value is taken into a microcomputer, or a contact failure of a sensor itself may occur. In the case of a three-phase AC current sensor, it normally has a sine wave AC waveform, but the spike noise indicates a state deviating from the waveform.

(System Configuration)

Figure 1:
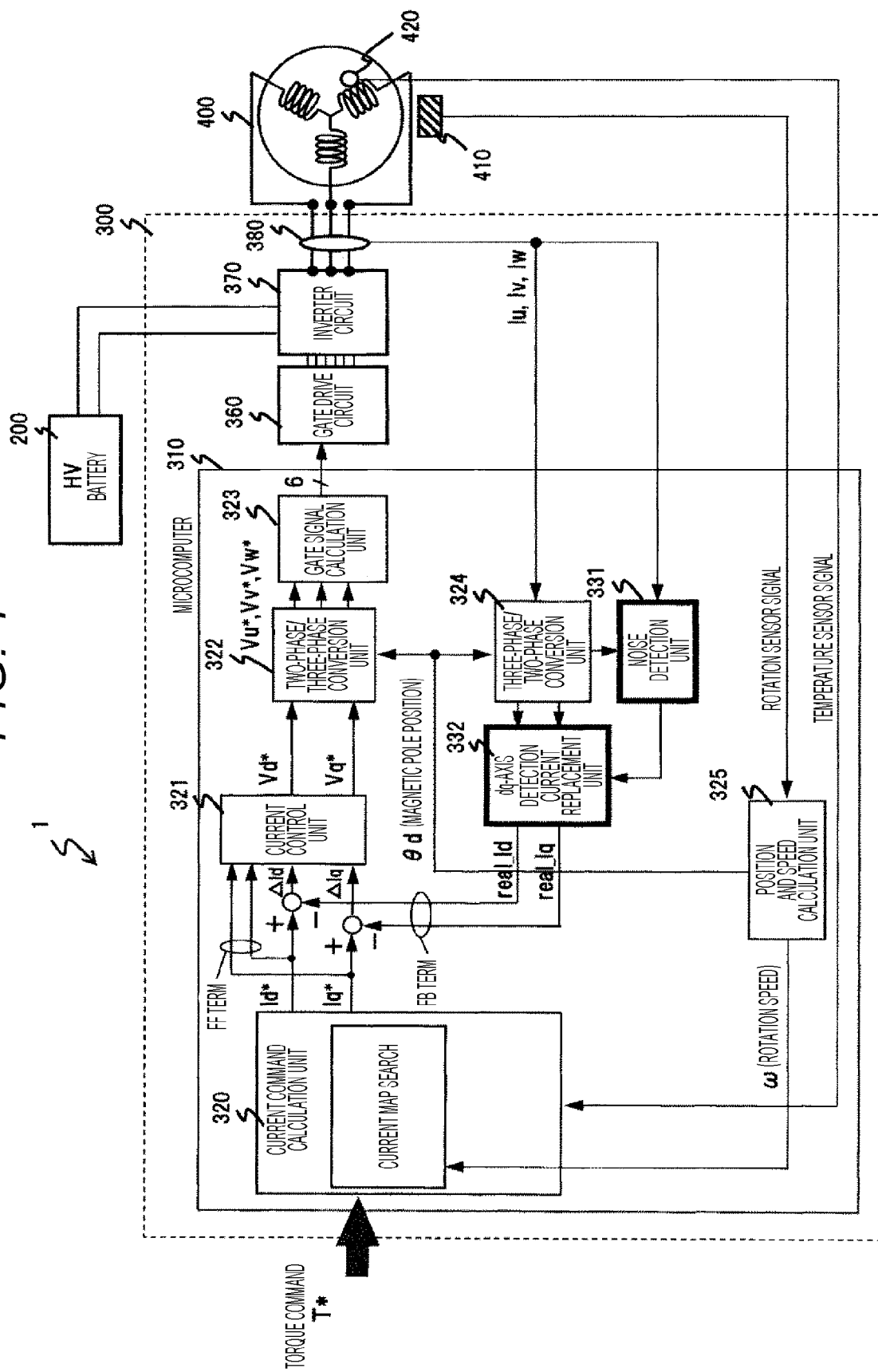
FIG. 1 is a diagram showing a motor control system including a control device (motor control device) according to an embodiment of the present invention.

First, the configuration of a motor control system will be described. FIG. 1 is a diagram showing a motor control system 1 including a control device 300 (motor control device) according to the embodiment of the present invention.

The motor control system 1 includes a motor 400 (rotating electric machine as a three-phase AC motor), an HV battery 200 (battery), and a control device 300 that controls these.

The control device 300 includes a microcomputer 310, a gate drive circuit 360 that converts a signal output from the microcomputer 310 into a signal for driving a power module element such as an IGBT, an inverter circuit 370 having a power module that switches power from an HV battery 200 (power supply circuit) into a three-phase AC waveform based on the signal from the gate drive circuit 360, and a current sensor 380 that detects a current flowing in U, V, and W phases.

A rotation position sensor 410 attached to the motor 400 has a function of detecting the rotation position of a rotor as a rotation angle. For example, a resolver is used as the rotational position sensor. This signal is taken into the microcomputer, and a position and speed calculation unit 325 (position and speed calculator) calculates the magnetic pole position $\theta d$ and the rotation speed $\omega$ of the motor 400 from the time derivative of the rotation angle. The magnetic pole position θd is used for conversion by a two-phase/three-phase conversion unit 322 or a three-phase/two-phase conversion unit 324, and the rotation speed ω is used for calculating a current command value.

The HV battery 200 is a power source that supplies driving power to the motor 400, and for example, a lithium ion battery or a nickel hydride battery having an inter-terminal voltage of 300V is used.

The HV battery 200 is connected to the motor 400 via the inverter circuit 370. The HV battery 200 supplies power to the motor 400 when the motor 400 performs a power running operation, and receives regenerative power when the motor 400 performs a regenerative operation. In this manner, the HV battery 200 charges the battery.

The microcomputer 310 includes a current command calculation unit 320, a current control unit 321, the two-phase/three-phase conversion unit 322, a gate signal calculation unit 323, the three-phase/two-phase conversion unit 324, the position/speed calculation unit 325, the noise detection unit 331, and a dq-axis detection current replacement unit 332, and adopts a vector control method in which coordinates of a three-phase AC system are converted into two-phase coordinates to control the current. The microcomputer 310 includes a processor such as a CPU (Central Processing Unit), a memory such as a RAM (Random Access Memory), a ROM (Read Only Memory), and an input/output circuit.

Based on the torque command value T* to be output by the motor 400 input from a host controller, the current command calculation unit 320 calculates the required d-axis current command value Id* and the q-axis current command value Iq* from, for example, a current map in which the relationship between the motor torque and the current command value that has been derived in advance by motor adaptation is embedded in consideration of the rotation speed and the HV battery voltage.

That is, the current command calculation unit 320 converts the torque command into dq-axis current commands. When the dq-axis current command values are calculated, consideration is given to protection of components from a motor temperature acquired from a motor temperature sensor 420 and an inverter temperature (not shown).

The current control unit 321 calculates the d-axis voltage command Vd* and the q-axis voltage command Vq* from the dq-axis current command values (Id* and Iq*) calculated by the current command calculation unit 320 and the dq-axis detection current value (real_Id and real_Iq) obtained through conversion from the current values (Iu, Iv, and Iw) detected by the current sensor 380 into the dq-axis currents in the three-phase/two-phase conversion unit 324 and further through a predetermined process in the dq-axis detection current replacement unit 232.

That is, the three-phase/two-phase conversion unit 324 converts the three-phase AC current detected by the current sensor 380 into the dq-axis currents as dq-axis detection currents. The current control unit 321 performs feedback control based on the dq-axis current commands and the dq-axis detection currents.

More specifically, the current control unit 321 performs current feedforward control and current feedback control, and as the current feedback control, proportional-integral control (PI control) is included. The d-axis current deviation ΔId and the q-axis current deviation ΔIq are calculated from the dq-axis current command values and the dq-axis detection current values. From these, using the PI control, the d-axis voltage deviation ΔVd and the q-axis voltage deviation ΔVq are calculated as the feedback term (FB term), and the feedback term (FB term) is added to the feedforward term (FF term) obtained from the dq-axis current command values to calculate the d-axis voltage command Vd* and the q-axis voltage command Vq*.

The two-phase/three-phase conversion unit 322 has a function of converting the dq-axis voltage commands calculated by the current control unit 321 into each phase voltage. That is, the d-axis voltage command Vd* and the q-axis voltage command Vq* are converted into each phase voltage command Vu*, Vv*, and Vw* based on the magnetic pole position angle θd of motor 400.

The gate signal calculation unit 323 generates a PWM signal for controlling each power module element in the inverter circuit 370 by comparing each phase voltage command Vu*, Vv*, and Vw* with a carrier wave. The inverter circuit 370 has a total of six power module elements due to the presence of two upper and lower arms for each phase, and outputs six PWM signals as well. The final PWM signal is generated in consideration of the HV battery voltage and dead time compensation.

The inverter circuit 370 supplies power for realizing a desired torque from the HV battery to the motor 400 by turning on/off the upper and lower arms of the power module elements according to the six PWM signals.

The noise detection unit 331 and the dq-axis detection current replacement unit 332 are features of the present invention.

The noise detection unit 331 is a part that determines whether or not spike noise has been applied to the current values (Iu, Iv, and Iw) detected by the current sensor 380, and there are a method of determining from the current values (Iu, Iv, and Iw) detected by the current sensor 380 and a method of determining after conversion to Id and Iq axes as described later.

In other words, the noise detection unit 331 detects a noise state indicating a state in which the three-phase AC current deviates from the sine waveform.

When the noise detection unit 331 determines that noise has been generated, as described later, the dq-axis detection current replacement unit 332 replaces the dq-axis detection currents calculated from the three-phase/two-phase conversion unit 324 with other values, and calculates real_Id and real_Iq.

In other words, the dq-axis detection current replacement unit 332 performs replacement process of the dq-axis detection currents while detecting the noise state.

(First Determination Method for Spike Noise)

Figure 2:
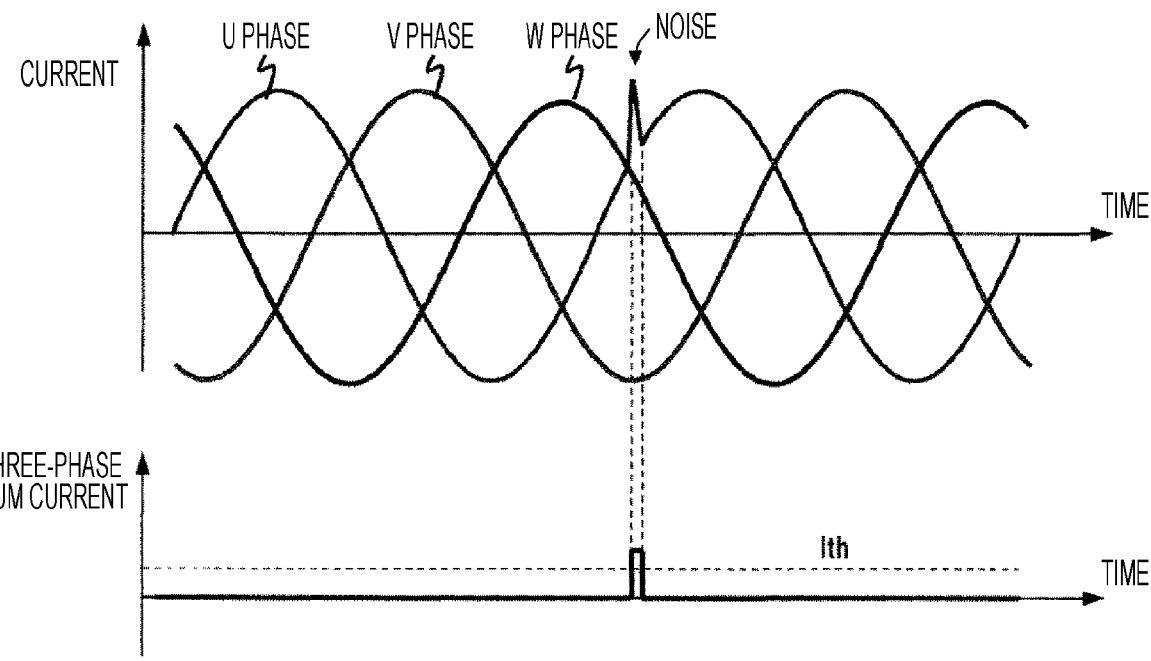
FIG. 2 is a diagram showing an example of a state in which spike noise is applied to a U-phase current sensor.

Next, a first determination method for spike noise by the noise detection unit 331 will be described. FIG. 2 is a diagram showing an example of a state in which spike noise is applied to a U-phase current sensor 380.

Since the neutral points of the coils of each phase of the motor 400 are connected in common, the current sum of the three phases (three-phase sum current) of U, V, and W flowing through the motor is theoretically 0. When the spike noise is applied as in this figure, the relationship is broken.

Therefore, when the three-phase sum current exceeds the predetermined value Ith, the noise detection unit 331 determines that spike noise is applied. That is, when the three-phase sum of the three-phase AC current exceeds the predetermined value Ith, the noise detection unit 331 determines that the noise state has been detected. In order to prevent erroneous detection, it may be determined that the noise state has been detected when the state in which the three-phase sum current exceeds the predetermined value Ith continues for a predetermined time.

(Second Determination Method for Spike Noise)

Figure 3:
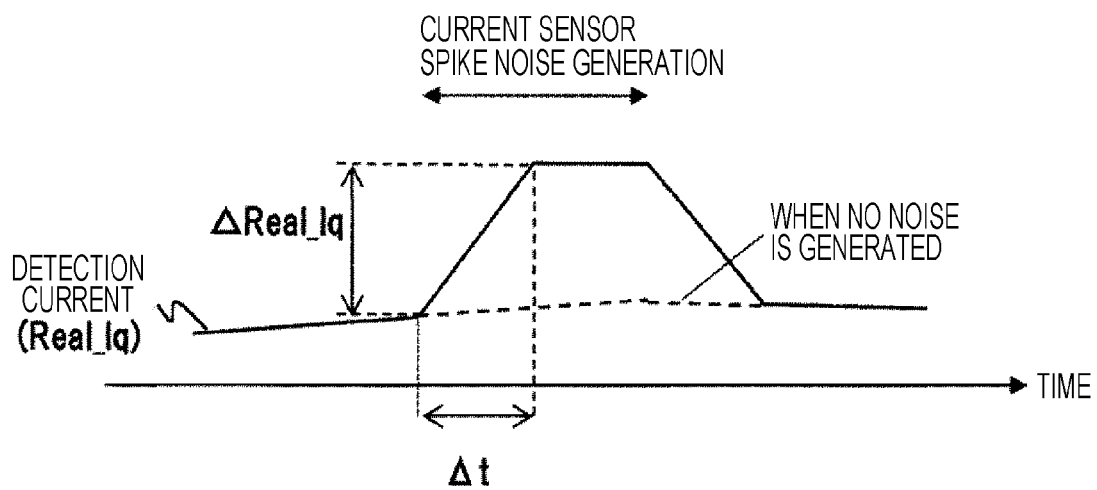
FIG. 3 is a diagram showing an example of a state in which spike noise is applied to the current sensor.

Next, a second determination method for spike noise by the noise detection unit 331 will be described. FIG. 3 is a diagram showing an example of a state in which spike noise is applied to the current sensor 380. FIG. 3 shows an example of the Iq current.

When spike noise is applied in a state in which the torque command is constant, the Iq current converted by the three-phase-two-phase conversion changes abruptly.

The noise detection unit 331 obtains the degree of change (slope) from $\Delta real\_Iq/\Delta t$, and when the value exceeds a predetermined value, determines that spike noise has been applied. That is, when the degree of change of the dq-axis detection currents exceeds a predetermined value, the noise detection unit 331 determines that the noise state has been detected.

In addition, after the spike noise has been generated, the noise detection unit 331 determines that the spike noise has been removed when the degree of change in the opposite direction (sign is opposite) to that when the spike noise is detected occurs.

Even when the torque command is suddenly changed, the degree of change of the Real_Iq is large, and there is a possibility that an erroneous determination is made. Therefore, the degree of change ($\Delta Iq^*/\Delta t$) of the Iq current command is calculated, and it is determined that the spike noise has been applied from the comparison between the degree of change of the Iq current command and the degree of change of the Iq detection current. In that case, the robustness is higher.

Specifically, when $\Delta real\_Iq/\Delta t$ exceeds a predetermined value and $\Delta real\_Iq/\Delta t$ deviates largely from $\Delta Iq^*/\Delta t$, the noise detection unit 331 determines that spike noise has been applied. That is, when $\Delta real\_Iq/\Delta t$ exceeds a predetermined value and the difference between the absolute values of $\Delta\_Iq/\Delta t$ and $\Delta Iq^*/\Delta t$ is larger than the threshold, the noise detection unit 331 determines that spike noise has been applied.

In other words, when the degree of change of the dq-axis detection currents exceeds a predetermined value and the degree of change of the dq-axis detection currents is greater than the degree of change of the dq-axis current commands, the noise detection unit 331 determines that the noise state has been detected.

(First Replacement Method for Current Detection Value)

Figure 4:
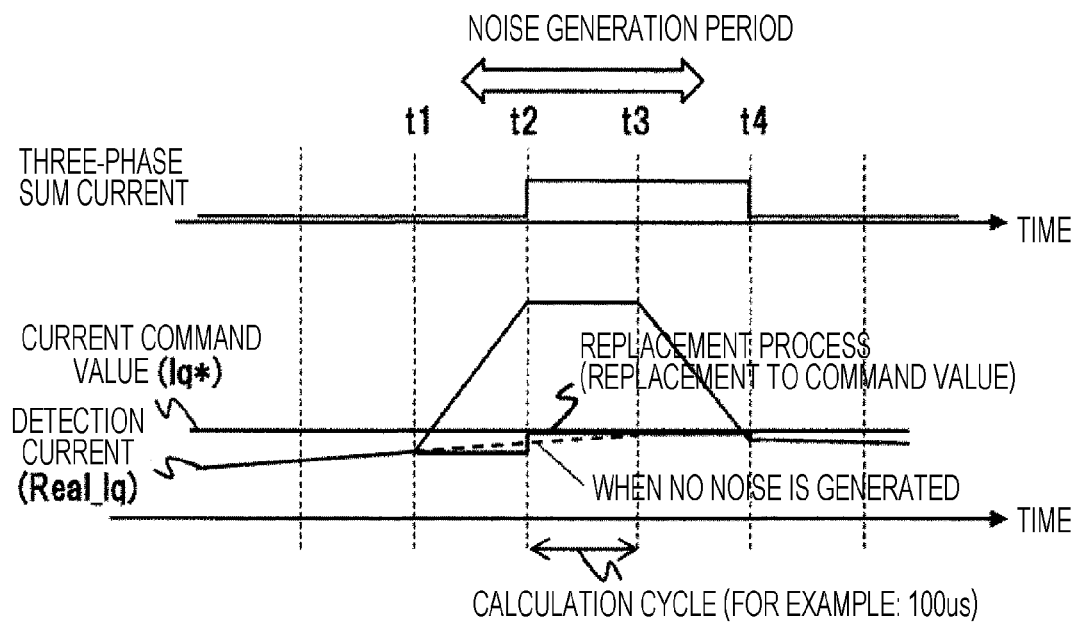
FIG. 4 is a diagram showing an example of a replacement process when spike noise is applied to the current sensor.

Next, a first replacement method for the current detection value by the dq-axis detection current replacement unit 332 will be described. FIG. 4 is a diagram showing an example of a replacement process when spike noise is applied to the current sensor. FIG. 4 shows a replacement process of the Iq current detection value. Here, it is assumed that the noise generation determination is performed based on, for example, a three-phase sum current.

The output value from the current sensor 380 is taken in in the cycle of the current control calculation, and the calculation interval between t1 and t2 is, for example, at 100 us (microsecond).

When three-phase AC current sensor noise is generated between t1 and t2, the three-phase sum current indicates a value other than 0, so that the noise detection unit 331 determines that noise is applied. When it is determined that noise is applied, the dq-axis detection current replacement unit 332 performs a replacement process with Real_Iq=Iq*.

That is, the dq-axis detection current replacement unit 332 replaces the current value detected by the current sensor 380 with the current command value. Specifically, the dq-axis detection current replacement unit 332 replaces the latest dq-axis detection currents with the dq-axis current commands. When no noise is generated, the detection current Real_Iq moves as indicated by the broken line as shown in FIG. 4.

After the noise has been generated, at time t2, at the timing of taking in the output value of the current sensor 380, the noise detection unit 331 determines that the noise has been generated from the three-phase sum current, and the dq-axis detection current replacement unit 332 immediately replaces the Real_Iq. Therefore, the value (detection current) when noise is generated is not used for the calculation.

When the three-phase AC current sensor noise is removed between t3 and t4, the three-phase sum current indicates approximately 0 (the predetermined value Ith or less), so that the noise detection unit 331 determines that the noise has been removed. When it is determined that the noise has been removed, the dq-axis detection current replacement unit 332 stops the replacement process of Real_Iq, returns Real_Iq so that "Real_Iq=calculation value (detection value) from the current sensor 380", and performs normal control.

(Second Replacement Method for Current Detection Value)

Figure 5:
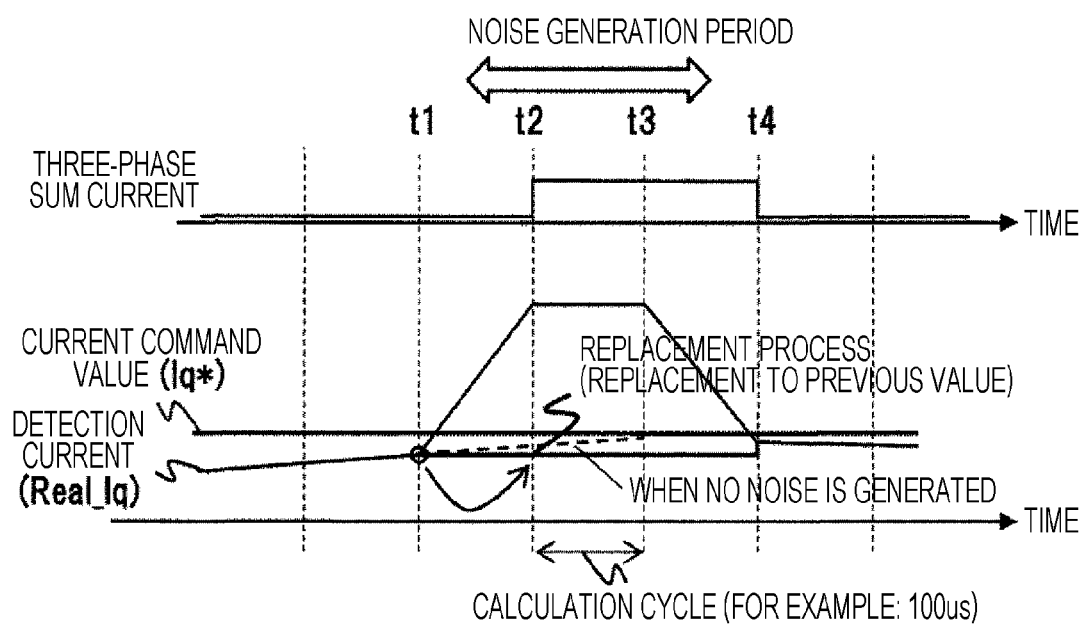
FIG. 5 is a diagram showing another example of the replacement process when spike noise is applied to the current sensor.

Next, a second replacement method for the current detection value by the dq-axis detection current replacement unit 332 will be described. FIG. 5 is a diagram showing another example of the replacement process when spike noise is applied to the current sensor 380. FIG. 5 shows a replacement process of the Iq current detection value.

The noise generation detection operation is the same as in FIG. 4. That is, as an example, the noise detection unit 331 determines whether or not spike noise has been applied based on the three-phase sum current.

When noise is generated, the dq-axis detection current replacement unit 332 performs a replacement process with Real_Iq=Real_Iq previous value (before generation of noise). That is, the dq-axis detection current replacement unit 332 replaces the latest current value detected by the current sensor 380 with the current value detected by the current sensor 380 one cycle earlier. In other words, the dq-axis detection current replacement unit 332 replaces the latest dq-axis detection currents with the dq-axis detection currents before detecting the noise state.

When it is determined that the noise has been removed, the replacement process of Real_Iq is stopped, Real_Iq is returned so that "Real_Iq=calculation value (detection value) from the current sensor 380", and normal control is performed.

(Shifting to Degeneration Mode)

Figure 6:
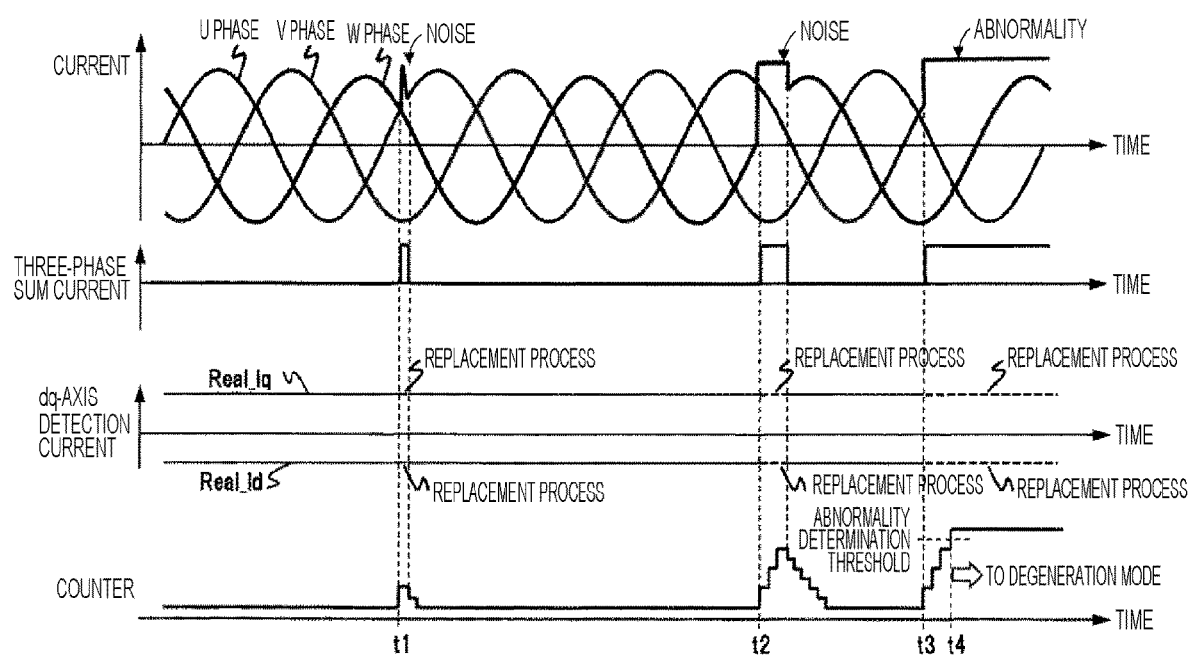
FIG. 6 is a diagram showing an example of an operation when spike noise is applied to the current sensor and the state continues for a predetermined time.

Next, a process for shifting to the degeneration mode (fail safe) will be described. FIG. 6 is a diagram showing an example of an operation when spike noise is applied to the current sensor 380 and the state continues for a predetermined time.

When it is determined from the three-phase sum of the currents that spike noise has been applied (t1, t2, and t3), the dq-axis detection current replacement unit 332 increases a counter and performs a replacement process of the dq-axis detection currents.

The dq-axis detection current replacement unit 332 shifts to the degeneration mode when the spike noise continuation time indicating the period during which the counter increases continues for a long time (for example, a threshold or more). Even in the case of a hunting operation for noise generation/removal, the count is increased by 2 when noise is generated and is reduced by 1 when noise is removed so that an abnormality can be definitely determined.

When the spike noise continuation time becomes long and the counter exceeds an abnormality determination threshold (t4), the dq-axis detection current replacement unit 332 determines that the abnormality has been determined, and shifts to the degeneration mode.

The dq-axis detection current replacement unit 332 may shift to the degeneration mode when the noise state continues for a predetermined time or when the noise state is intermittently detected a predetermined number of times. After the shifting to the degeneration mode, when a predetermined condition (for example, at the time of resetting the microcomputer) is satisfied, the mode may return to the normal mode.

As described above, when the current supplied to the motor 400 changes suddenly, the control device 300 (motor control device) of the present embodiment continues the motor control using the current command value or the detection current value before the current changes suddenly instead of the latest detection current value. According to the present embodiment, a sudden change in torque due to spike noise can be suppressed.

In addition, the embodiment of the present invention may be the following aspects.

(1). A motor control device that continues motor control, in a noise generation period in which the three-phase AC current of U, V, and W is detected and the three-phase sum of the three-phase AC current is equal to or larger than a predetermined value, using a current command instead of the three-phase AC detection current value or using the previous detection current value before the generation of noise instead of the three-phase AC detection current value.

The sum of the respective phase currents of the three-phase alternating currents of U, V, and W is theoretically 0, but when noise or the like is applied, a non-zero state occurs. Therefore, the noise generation state can be detected from the value of the three-phase current sum.

If control is continued in a state in which noise is applied to the detected current, current control is performed based on the detected current to which noise has been applied, and hence there is a possibility that a sudden change in the motor drive current and a sudden change in torque occur.

Therefore, when noise is generated, by replacing the detected current with the current command value, it is possible to remove the influence of noise and suppress a sudden change in the motor drive current. Further, as another means, by replacing the detected current with the detection current value before the generation of noise, it is possible to suppress the sudden change of the motor drive current similarly.

In addition, as the replacement process of the detection current, the following two ways are given. (i) Replacement with the three-phase AC current (Iu, Iv, and Iw) and (ii) replacement with currents (Id, and Iq) obtained by converting three phases into two phases on the dq axes. In the case of the replacement process in (i), the current has an AC waveform, and hence it cannot be a fixed value and must be changed according to the motor phase, which complicates the process. Thus, the method of (ii) is effective.

According to (1), even if noise is applied to the three-phase AC current sensor, the motor can be controlled without causing a sudden change in the motor drive current.

(2). A drive device for an inverter that controls driving of an AC motor, and which is a motor control device including: current command calculation means that converts a torque command value into dq-axis current commands; three-phase current detection means that detects a three-phase AC current of U, V, and W; three-phase two-phase conversion means that converts the three-phase AC current to dq-axis detection currents; current control means that performs control for driving the AC motor based on the dq-axis current commands and the dq-axis detection currents; noise detection means that detects the noise state when noise is superimposed on the three-phase AC current; and dq-axis detection current replacement means that performs a replacement process of the dq axis detection currents while the noise state is detected.

(2) is obtained by adding more specific components to (1). In vector control, current control is performed by converting a three-phase current into two-phase dq-axis currents. Therefore, the torque command value is converted into two-phase dq-axis current command values by the current command calculation unit, and the three-phase AC current of U, V, and W acquired by the three-phase current detection unit is converted into two-phase dq-axis detection currents by the three-phase/two-phase conversion unit. The current sensor detects the three-phase AC current, and spike noise is superimposed on this sensor unit.

When the spike noise is superimposed on the three-phase AC current, accordingly, the influence is also caused on the dq-axis detection currents which are three-phase-two-phase converted. Since the motor drive control has a function of performing feedback control of the deviation between the dq-axis detection currents and the dq-axis current command values, for example, if noise is applied in a direction in which the dq-axis detection currents are positive, the dq-axis detection currents are in a large state with respect to the dq-axis current command values. Thus, the feedback control acts in the direction of rapidly reducing the motor drive current, which causes a sudden decrease in torque.

Therefore, when the spike noise generation state is detected, a replacement process of the dq-axis detection currents is performed.

According to (2), the influence of spike noise of the dq-axis detection currents can be removed, so that a sudden change in the motor drive current can be prevented. That is, even if noise is applied to the three-phase AC current sensor, the motor can be controlled without causing a sudden change in the motor drive current.

(3). The motor control device according to (2), in which the noise detection means determines that noise has been generated when the three-phase sum of the three-phase AC current of the U, V, and W is equal to or more than a predetermined value.

It is assumed that the current sensor is connected to each of the U, V, and W phases. The sum of the respective phase currents of the three-phase alternating currents of U, V, and W is theoretically 0 because the neutral points of the coils of each phase of the motor are connected in common, but when noise or the like is applied, a non-zero state occurs. Therefore, the noise generation state can be detected from the value of the three-phase current sum (see FIG. 2).

According to (3), it is possible to detect a state in which noise is being generated in the three-phase AC current sensor. Since the noise is determined by the three-phase current sum, it is not possible to determine which phase the noise is applied to, but there is an advantage that the noise can be detected with a simple configuration.

(4). The motor control device according to (2), in which the noise detection means determines that noise has been generated when a sudden change in the dq-axis detection currents occurs.

When the torque command is constant, basically, the detected current on the dq axes shows a substantially constant value. Therefore, when a sudden change in the dq-axis detection currents occurs, it can be determined that noise has been applied (see FIG. 3).

According to (4), it is possible to detect a state in which noise is being generated in the three-phase AC current sensor.

(5). The motor control device according to (2) to (4), in which the dq-axis detection current replacement means sets the dq-axis current commands to the dq-axis detection currents.

When noise is applied to the current sensor, the detection value is greatly increased, but if it is used as it is, the current feedback control is corrected, and a sudden change in torque occurs.

Therefore, by replacing the detection value of the current sensor when noise is applied to the current sensor with the current command value instead of the actual detection value, the input of the current detection sudden change value to the current feedback control can be prevented (See FIG. 4).

Although the current sensor noise is generated in the three-phase AC current sensor, the configuration is simplified by performing the replacement process itself of the current value using the dq-axis currents. When the replacement process is performed with the three-phase AC current sensor, it is necessary to trace the sine waveform. When noise is generated, it is necessary to replace it with a sine waveform corresponding to the phase. However, the replacement process is performed using the dq-axis currents, so that correction is facilitated.

According to (5), it is possible to suppress a sudden change in motor current control, that is, a sudden change in torque.

(6). The motor control device according to (2) to (4), in which the dq-axis detection current replacement means sets the dq-axis detection currents before the noise detection.

When the dq-axis current commands are set as the replacement unit as in (5), the dq-axis current deviation becomes 0, and the integral term of the current feedback control becomes the previous value maintained during the transient response. Thus, it is conceivable that the current response is delayed. Therefore, it is possible to maintain responsiveness by setting the previous values of the dq-axis detection currents before the generation of noise as in (6) (see FIG. 5).

However, there is no problem when spike noise is generated for a short time, but if the noise generation period becomes longer and the state in which the previous value is maintained continues, the integral term is accumulated and overcorrection of the current occurs. Therefore, control for switching to the dq-axis current command values in the middle may be incorporated.

Instead of setting the previous value itself, a value may be set in consideration of a predetermined ratio of the difference between the previous values and the dq-axis current commands, for example, as in the following equation. The predetermined ratio may be variable with time. As the correction value A, 0 to 1 is set.

Real_Iq replacement=Real_Iq previous value+(Iq*−Real_Iq previous value)×correction value A For example, immediately after noise generation, setting is made so that the correction value A=0, and the previous value is held as it is. However, in the next calculation cycle, setting is made so that the correction value A=0.2, and the q-axis current command value (Iq*) is taken into consideration. Finally, setting is made so that the correction value A=1 and replacement with the q-axis current command value (Iq*) is made, so that overcorrection can be prevented while responsiveness is ensured.

According to (6), it is possible to suppress a sudden change in the motor current control, that is, a sudden change in the torque while maintaining the responsiveness of the current control.

(7). The motor control device according to (2) to (6), in which, when the noise detection state continues for a predetermined time or when the noise detection state is experienced intermittently a predetermined number of times, it is determined that the current sensor abnormality has been determined, and in addition to the replacement process of the dq axis detection currents, the mode is shifted to a degeneration mode.

If the noise generation state continues, the replacement with the detected current cannot follow the torque request from the host controller, and the control cannot be performed safely. Therefore, when an abnormality that continues for a long time occurs instead of noise, as in (7), the safety state is ensured by separately shifting the mode to the degeneration mode in addition to the replacement process (see FIG. 6).

The degeneration mode is a safety measure for securing power required to safely evacuate a vehicle to a shoulder of a road or a repair shop when an abnormality occurs. As an example of the degeneration mode, for example, in the case of a hybrid vehicle equipped with an engine, as the motor, there are given methods including a three-phase short-circuit mode in which the upper arms or the lower arms of the three-phase gate are fully turned on, and a three-phase open mode in which the upper arms or the lower arms of the three-phase gate are fully turned off, while switching to engine running is made.

In the case of an electric vehicle using only the motor 400, for example, current control is performed only by feedforward control by limiting the torque command value. The dq-axis current command values (Id* and Iq*) and the dq-axis voltage command values (Vd* and Vq*) may be limited instead of the torque command value.

According to (7), in a scene where spike noise is generated, current control can be continued without a sudden change in torque, and when a real failure occurs, shifting to a safe driving operation state can be made.

Note that the present invention is not limited to the above embodiment, and various modifications are included. For example, the above embodiment has been described in detail for easy understanding of the present invention, and is not necessarily limited to those having all the configurations described.

Each of the above-described configurations, functions, and the like may be realized by hardware by designing a part or all of them with, for example, an integrated circuit. Further, each of the above-described configurations, functions, and the like may be realized by software by interpreting and executing a program that realizes each function by the processor (microcomputer). Information such as a program, table, and file that realizes each function can be stored in a recording device such as a memory, hard disk, SSD (Solid State Drive), or a recording medium such as an IC card, SD card, or DVD.

REFERENCE SIGNS LIST

1 motor control system
200 HV battery
300 control device
310 microcomputer 320 current command calculation unit
321 current control unit
322 two-phase/three-phase conversion unit
323 gate signal calculation unit
324 three-phase/two-phase conversion unit
325 position and speed calculation unit
331 noise detection unit
332 dq-axis detection current replacement unit
360 gate drive circuit
370 inverter circuit
380 current sensor
400 motor
410 rotation position sensor
420 motor temperature sensor

The invention claimed is:

1. A motor control device that continues motor control using a current command value or a detection current value prior to a current supplied to a motor changes within a predetermined time instead of a latest detection current value when the current changes within the predetermined time, the motor control device comprising:
   a sensor;
   a memory; and
   a processor communicatively coupled to the sensor and the memory, wherein the processor is configured to
   convert a torque command into dq-axis current commands,
   convert a three-phase AC current detected by a current sensor into dq-axis currents as dq-axis detection currents,
   perform feedback control based on the dq-axis current commands and the dq-axis detection currents,
   detect a noise state indicating a state in which the three-phase AC current deviates from a sine waveform,
   on a condition where the noise state is not detected, the dq-axis detection currents continue as normal, and
   on a condition where the noise state is detected, perform a correction by replacing the latest dq-axis detection currents with the dq-axis current commands,
   determine that the noise state was not detected or the correction occurred, and
   perform normal control based on the sensor.

2. The motor control device according to claim 1, wherein the processor determines that the noise state has been detected when a three-phase sum of the three-phase AC current exceeds a predetermined value.

3. The motor control device according to claim 1, wherein the processor determines that the noise state has been detected when a degree of change of the dq-axis detection currents exceeds a predetermined value.

4. The motor control device according to claim 3, wherein the processor determines that the noise state has been detected when the degree of change of the dq-axis detection currents exceeds the predetermined value, and the degree of change of the dq-axis detection currents deviates from a degree of change of the dq-axis current commands.

5. The motor control device according to claim 2, wherein the processor replaces the latest dq-axis detection currents with the dq-axis current commands.

6. The motor control device according to claim 2, wherein the processor replaces the latest dq-axis detection currents with the dq-axis detection currents before detecting the noise state.

7. The motor control device according to claim 2, wherein the processor shifts to a degeneration mode when the noise state continues for a predetermined time, or when the noise state is intermittently detected a predetermined number of times.

* * * * *